Aug. 9, 1932.  J. L. DRAKE  1,870,284
LAMINATED GLASS APPARATUS
Filed Sept. 18, 1926
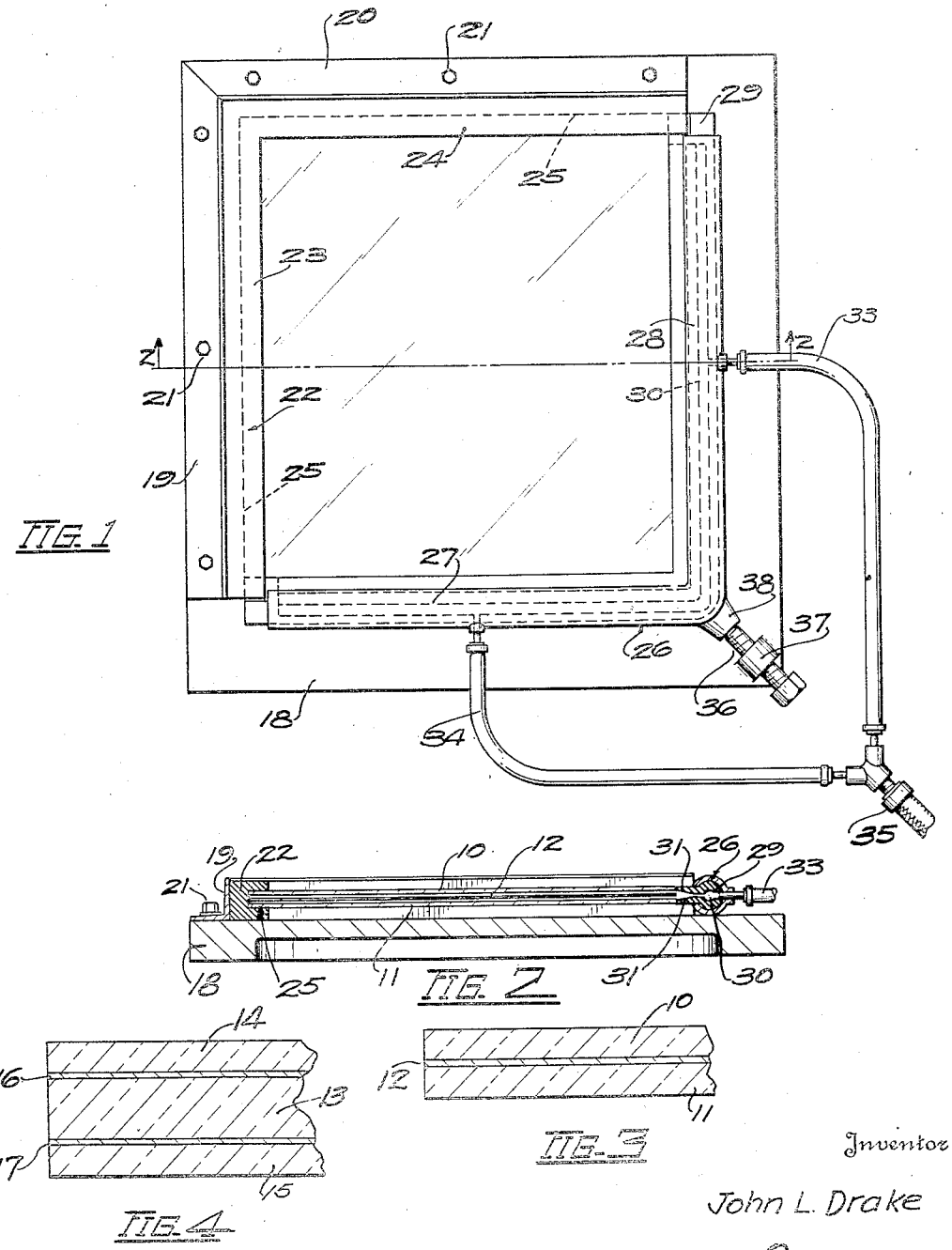
Inventor
John L. Drake
By Frank Fraser,
Attorney Patented Aug. 9, 1932

1,870,284

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

LAMINATED GLASS APPARATUS

Application filed September 18, 1926. Serial No. 136,239.

This invention relates to laminated glass apparatus, and has for its primary object the provision of an improved method and means for uniting a plurality of sheets to form a unitary structure.

Another object of the invention is the provision of means whereby atmospheric pressure may be utilized for uniting the sheets to produce a permanent union.

Another object of the invention is to provide means for creating a vacuum between the sheets so that the atmospheric pressure will cause the sheets to be united to create a unitary structure.

Another object of the invention is to provide an improved method characterized by creating a vacuum between the associated sheets of glass and non-brittle sheet or sheets of material from which the laminated glass is formed so that the atmospheric pressure will cause a welding together of the associated sheets throughout their entire area.

Other objects and advantages of the invention will become more apparent during the course of the following description when taken in connection with the accompanying drawing.

In the drawing wherein like numerals are employed to designate like parts throughout the same, Fig. 1 is a top plan view of improved apparatus constructed in accordance with the present invention, Fig. 2 is a sectional view taken on line 2—2 of Fig. 1 and Figs. 3 and 4 show portions of two different sheets of laminated glass.

Referring now more in detail to the accompanying drawing, in Figs. 3 and 4 have been shown portions of two finished sheets of laminated glass. In Fig. 3 the sheet is formed of three laminations, and consists of two sheets of glass 10 and 11 having interposed therebetween a non-brittle sheet of material 12. The sheet shown in Fig. 4 consists of five laminations including a central sheet of glass 13 and two outer sheets of glass 14 and 15. Interposed between the central sheet 13 and the outer sheets 14 and 15 are non-brittle sheets of material 16 and 17. Any suitable binder may be utilized for holding the sheets of glass and the non-brittle sheet or sheets of material together.

The present invention has for its primary purpose the provision of novel means for uniting the sheets of glass and the non-brittle sheet or sheets of material to produce a unitary structure, and while I have disclosed herein only two different forms of laminated glass, it is to be understood that the invention is not to be restricted to uniting any specific number of sheets arranged in any particular manner.

In the drawing, the numeral 18 designates the top of a table or other suitable support to the upper surface of which are secured brackets 19 and 20 by means of suitable bolts or the like 21. These brackets are disposed at right angles relative to one another at one corner of the table 18 adjacent the edges thereof, and constitute a rigid metal frame. Received within and adapted to abut against the brackets 19 and 20 is a similarly shaped rubber pad 22, consisting of the right angularly directed portions 23 and 24, said portions being provided with a continuous slot 25 for receiving the edges of the sheets from which the laminated glass is formed.

The numeral 26 designates a movable hollow frame or casing arranged at the corner of the table diagonally opposite the brackets 19 and 20. The casing 26 consists of the right angularly directed portions 27 and 28 within which is secured a rubber pad 29 provided with a slot 30. The pad 29 extends outwardly of the casing, and the provision of the slot 30 results in the formation of a pair of spaced resilient lips 31 adapted to engage the edges of the sheets. Carried by the right angularly directed portions 27 and 28 of the frame 26, and communicating with the slots 30 therein, is a pair of conduits 33 and 34 connected at their outer ends to a single conduit 35 which leads to and is connected with any suitable type of vacuum pump, not shown. While I have stated that the pads 22 and 29 are of rubber, yet it is to be understood that they may be formed of any other suitable material as desired.

In the operation of the present invention, the sheets of glass and non-brittle sheet or sheets of material are inserted within the recess 25 in the pad 22, after which the frame 26 is moved into position so that the spaced lips 31 of the rubber pad 29 will engage the opposite diagonal corners of the outer glass sheets. When so positioned, the entrance of air between the sheets is effectively prevented. The vacuum pump, not shown, is then operated to extract the air from between the sheets through the conduits 33, 34 and 35, whereby to form a vacuum between said sheets. When this has been done the atmospheric pressure upon the sheets will act to press them together to form a permanent union, and thus provide a unitary structure such as is shown in Figs. 3 and 4.

For the purpose of adjusting the movable frame 26 relative to the sheets, there is provided an adjusting screw 36 threaded through a bearing 37 formed on the support 18. This adjusting screw is adapted to engage a lug 38 formed at the corner of the frame 26, so that upon rotation of the screw 36, the frame 26 will be moved towards the sheets to force the lips 31 into engagement therewith.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for uniting a plurality of sheets to form a composite sheet including a stationary frame and a movable frame cooperating to support said sheets, and means for creating a vacuum between said sheets.

2. Apparatus for uniting a plurality of sheets to form a composite sheet including a stationary frame and a movable frame cooperating to support the sheets, resilient means for preventing the entrance of air between said sheets, and means for creating a vacuum between said sheets.

3. Apparatus for uniting a plurality of sheets to form a composite sheet including a stationary frame and a movable frame cooperating to support the sheets, resilient means carried by said frames and engaging the sheets for preventing the entrance of air therebetween, means for adjusting the movable frame relative to said sheets, and means for creating a vacuum between said sheets.

4. An improved method for producing laminated glass which consists in first associating a plurality of glass sheets and sheet or sheets of non-brittle material in predetermined relationship, supporting the sheets at the edges thereof only, exhausting the air from between said sheets, and in then uniting the same.

5. Apparatus for uniting a plurality of sheets to form a composite sheet, including means for supporting the sheets at the edges thereof only to prevent the entrance of air therebetween, and means for creating a vacuum between the sheets.

6. Apparatus for uniting a plurality of sheets to form a composite sheet, including resilient means engaging the sheets at the edges thereof only to retain them in a position to prevent the etrance of air therebetween, and means for creating a vacuum between the sheets.

7. Apparatus for uniting a plurality of sheets to form a composite sheet, including a stationary resilient pad and a movable resilient pad for engaging the sheets at the edges thereof only to prevent the entrance of air therebetween, and means associated with said movable pad for exhausting the air from between said sheets.

8. Apparatus for uniting a plurality of sheets to form a composite sheet, including a stationary frame and a movable frame for supporting the sheets at the edges thereof only, and means for creating a vacuum between said sheets.

9. Apparatus for uniting a plurality of sheets to form a composite sheet, including a stationary frame and a movable frame, said frames being adapted to support the sheets at the edges only, and resilient means carried by the frames and engaging the edges only of the sheets to prevent the entrance of air therebetween during the uniting thereof.

10. Apparatus for uniting a plurality of sheets to form a composite sheet, including a plurality of frames, and resilient holding means carried by said frames and engaging the edges only of the sheets to position said sheets and prevent the entrance of air therebetween while permitting the uniting thereof.

11. Apparatus for uniting a plurality of sheets to form a composite sheet, including a stationary frame and a movable frame, resilient holding means carried by said frames and engaging the edges only of the sheets to position said sheets and prevent the entrance of air therebetween while permitting the uniting thereof, and means associated with one of said frames for exhausting the air from between said sheets.

12. An improved method for producing laminated glass, which consists in first arranging the sheets to be joined in properly assembled relation, sealing the sheets at the edges thereof to prevent the entrance of air therebetween, exhausting the air from between the sheets, and then uniting the same.

13. An improved method for producing laminated glass, which consists in first arranging the sheets to be joined in properly assembled relation, supporting the sheets at the edges only, sealing the sheets at the edges thereof to prevent the entrance of air therebetween, exhausting the air from between the sheets, and then uniting the same.

14. An improved method for producing laminated glass, which consists in first arranging the sheets to be joined in properly assembled relation, positioning the sheets and sealing the edges thereof by a single operation, exhausting the air from between the sheets, and then uniting the same.

15. An improved method for producing laminated glass, which consists in first arranging the sheets to be joined in properly assembled relation, bringing into engagement with the edges only of the sheets a holding means to position the sheets and prevent the entrance of air therebetween, exhausting the air from between the sheets, and then uniting the same.

16. A process for applying pressure to a set of sheets of similar size to form a composite sheet, which consists in assembling the sheets with their edges flush, shielding the edges of the sheets where they join against the application of fluid pressure, while leaving the major portion of the outer faces of the outer sheets of the set exposed, and applying fluid pressure on all sides of the set as thus assembled.

17. A process for applying pressure to a set of sheets of similar size to form a composite sheet, which consists in assembling the sheets with their edges flush, shielding the edges of the sheets where they join against the application of fluid pressure, while leaving the major portion of the outer faces of the outer sheets of the set exposed, applying suction to the shielded edges, and applying fluid pressure on all sides of the set as thus assembled.

18. An improved method for producing laminated glass, which consists in first arranging the sheets to be joined in properly assembled relation, sealing the sheets at the edges thereof to prevent the entrance of air therebetween, while leaving the major portion of the outer faces of the outer sheets exposed, and in then applying pressure to the sheets to unite the same.

19. An improved method for producing laminated glass, which consists in first arranging the sheets to be joined in properly assembled relation, shielding the edges of the sheets where they join against the application of pressure, while leaving the major portion of the outer faces of the outer sheets exposed, and applying pressure to the sheets to unite the same.

20. An improved method for producing laminated glass, which consists in first arranging the sheets to be joined in properly assembled relation, shielding the edges of the sheets where they join against the application of pressure, while leaving the major portion of the outer faces of the outer sheets exposed, applying suction to the shielded edges, and applying pressure to the sheets to unite the same.

21. An improved method for producing laminated glass, which consists in first arranging the sheets to be joined in properly assembled relation, shielding the edges of the sheets where they join against the application of pressure, but free to the application of suction, while leaving the major portion of the outer faces of the outer sheets exposed, and applying suction and pressure successively to the sheets.

22. Apparatus for uniting a plurality of sheets to form a composite sheet, including resilient strip material extending around and engaging the edges of the sheets and lying over the joinder between the sheets for shielding the same against the application of pressure, while leaving the major portion of the outer faces of the outer sheets exposed.

23. Apparatus for uniting a plurality of sheets to form a composite sheet, including means extending around the edges of the sheets and lying over the joinder between the sheets for shielding the same against the application of pressure, while leaving the major portion of the outer faces of the outer sheets exposed, and means for exhausting the air from inside the shielding means.

24. Apparatus for uniting a plurality of sheets to form a composite sheet, including resilient strip material extending around and engaging the edges of the sheets and lying over the joinder between the sheets for shielding the same against the application of pressure, while leaving the major portion of the outer faces of the outer sheets exposed, and means for exhausting the air from inside the strip material.

Signed at Toledo, in the county of Lucas and State of Ohio, this 15th day of September, 1926.

JOHN L. DRAKE.